JOHN FANING & FRIEDRICH LEGLER.
Improvement in Cultivators.

No. 120,732.  Patented Nov. 7, 1871.

Witnesses:  Inventor:

JOHN FANING & FRIEDRICH LEGLER.
Improvement in Cultivators.
No. 120,732.     Fig.3     Patented Nov. 7, 1871.
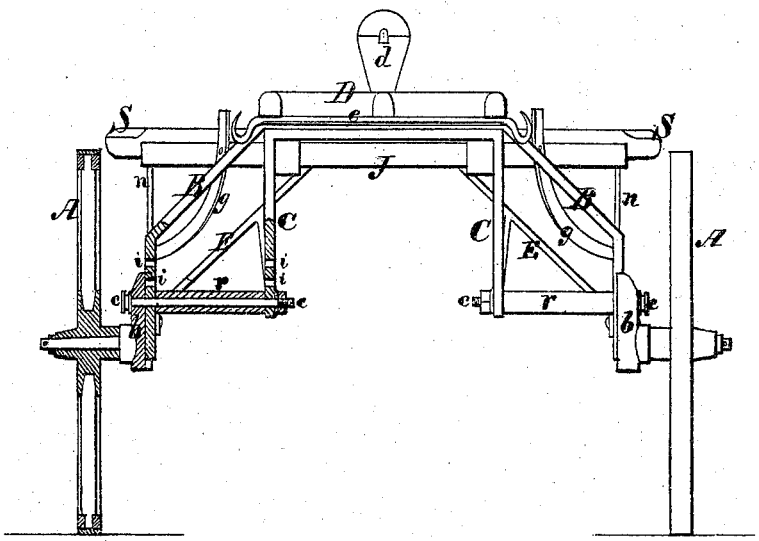
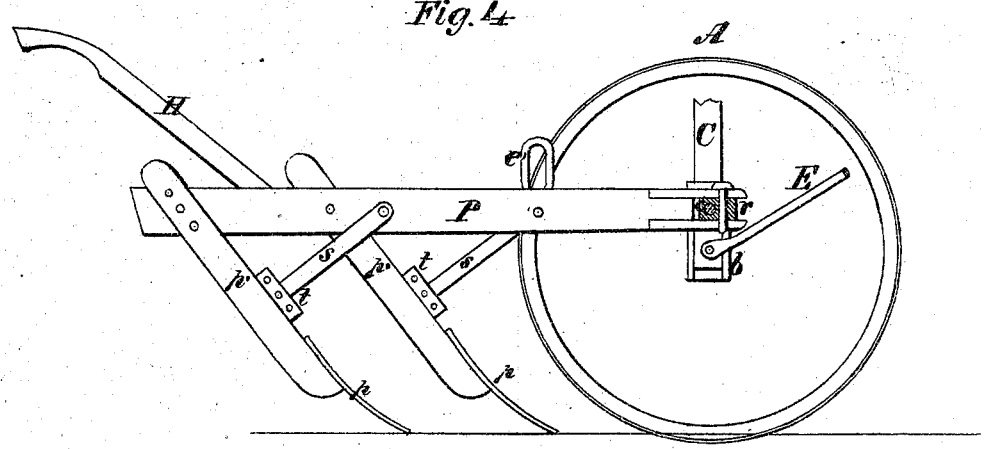
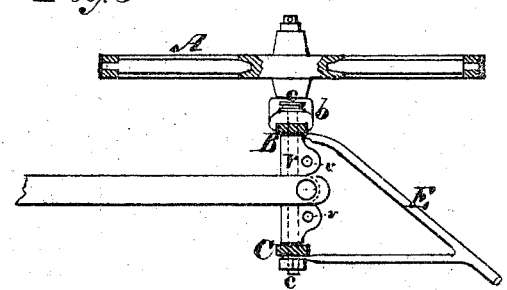

UNITED STATES PATENT OFFICE.

JOHN FANING AND FRIEDRICH LEGLER, OF BURLINGTON, IOWA.

IMPROVEMENT IN CULTIVATORS.

Specification forming part of Letters Patent No. 120,732, dated November 7, 1871.

*To all whom it may concern:*

Be it known that we, JOHN FANING and FRIEDRICH LEGLER, of Burlington, in the State of Iowa, have invented certain Improvements in what are known as Walking-Cultivators, of which the following is a description:

Our invention consists: First, in a contrivance by which the horses employed to draw the cultivator may be relieved of the weight of the tongue in a greater or less degree at the will of the driver. Secondly, in a novel combination and arrangement of compound arched axle, adjustable short beam-blocks, adjustable supporting bolts or pins, and the supporting-wheels with inner grooved guides and supports on their hubs, all in such manner that one pair of pins (one on each side) answers several useful purposes, as will be hereinafter described. Thirdly, in a combination of pivoted brace, grooved perforated metal block, and shovel-standard, as hereinafter described.

Figure 1:
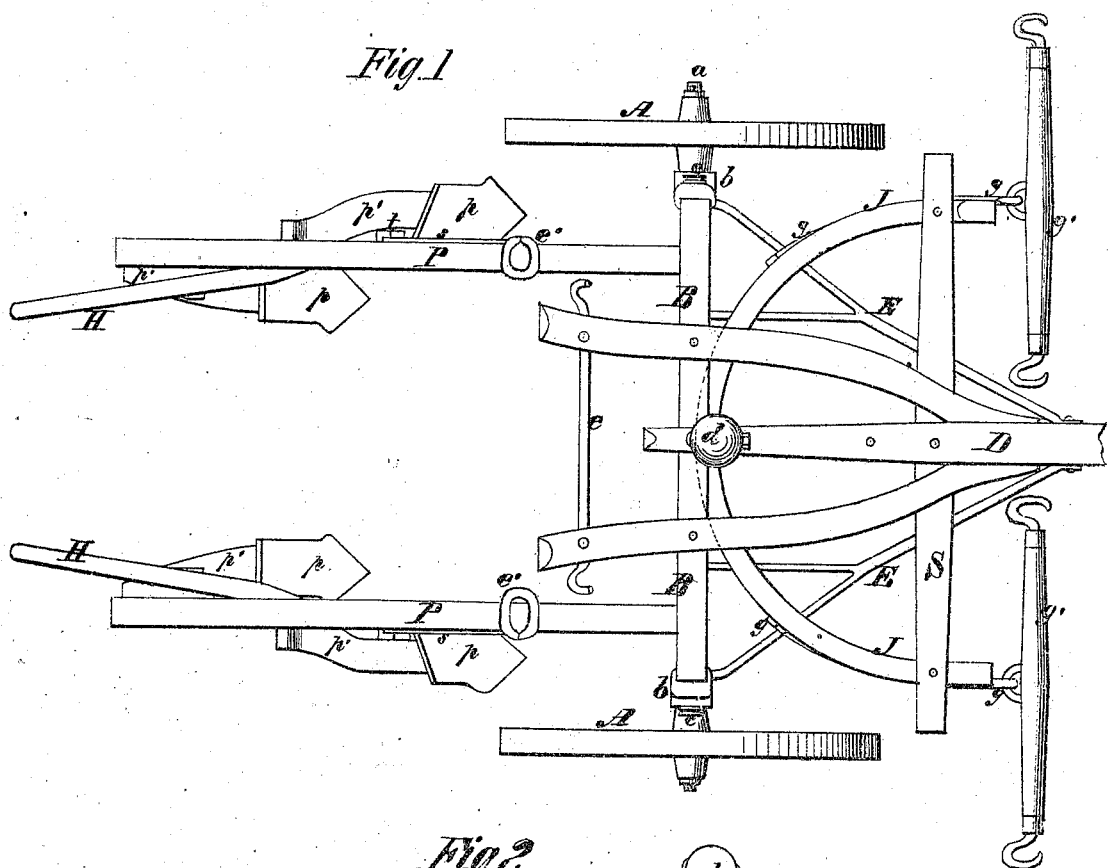
Figure 2:
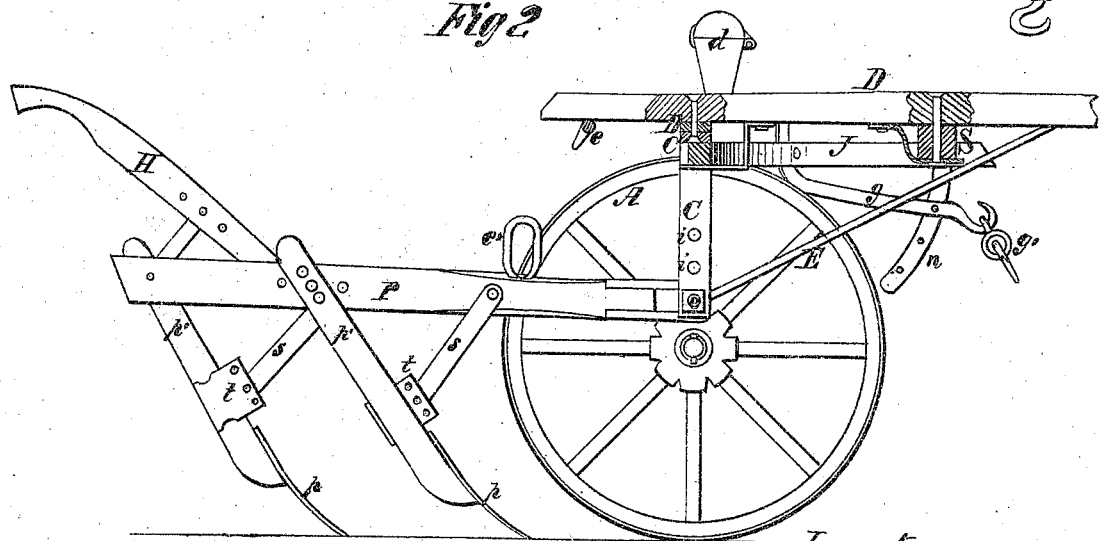

Figure 1 is a plan of the machine. Fig. 2 is a vertical section of the same made longitudinally through the machine. Fig. 3 is a cross-vertical section of the same. Figs. 4 and 5 show details of construction.

The first of the aforesaid objects is attained by the use of the contrivance J and its appendages. This contrivance is semicircular in shape, and is attached to and forms a part of the double-tree of the machine, and is made to slide at the rear side of its circumference through a clamp or its equivalent attached to the pole D and forming a fulcrum at that point. The single-trees $g'$ $g'$ are attached to hooks at the forward extremities of the arms $g$ $g$. These arms are pivoted to the semicircular part J, and extend above that part for the purpose of serving as stops to prevent the turning of the double-tree beyond the limits thus fixed. These arms $g$ $g$ can be raised or lowered at pleasure, being held in any desired position by means of bolts or pins passing through the same, and through the proper holes in the curved arms $n$ $n$. The lower the points at which these are fixed the greater will be the leverage power to raise the forward end of the pole or tongue D by the draft of the horses, and the more they will be relieved from the weight of the pole or tongue. The raised or arched axle connecting the wheels is constructed as shown in Fig. 3. The raised portion is formed of two bars of iron, B and C, which are bolted together where they are shown to be in contact, and so shaped that the inner one, C, shall form inside supports to the inner ends of the horizontal portion of the axle $r$ $r$, to which the beams of the cultivator are to be attached, and the outer one, B, shall form outside supports for these horizontal portions. These horizontal portions $r$ $r$ are made tubular, and of lengths just equal to the space intended to be preserved between the vertical portions of the two bars B and C. Bolts $c$ $c$ pass through holes formed in the bars B and C. These bolts are secured by nuts, which hold them firmly in place, and attach the axle, as thus far described, fast to the parts $b$ $b$, which will be described presently, in such a way as not to bind any of the contrivances by which the beams P P are to be attached to these arms $r$ $r$, but to leave these contrivances free and unconfined so far as it is desirable they should be so. The parts $b$ $b$ are most conveniently made of metal, cast with or inflexibly attached to the spindles on which the wheels of the cultivator are to turn. They should be constructed with grooves, in which the vertical parts of the bar B may slide up or down, and so shaped and arranged as to prevent the motion of the bar B in any other direction. When it is desired to change the height of the arch in the axle it is only necessary to unscrew the nuts which hold the bolts $c$ $c$, and having removed those bolts, to slide the parts $b$ $b$ up or down to the degree desired, and then reinsert these bolts through another set of holes, $i$ $i$, in the bars B and C. This will raise or lower the arch without changing the position of the beams of the cultivator in relation to the wheels or to the earth.

In Figs. 2 and 4 a series of holes is shown, by which the distances of the shovels below the respective beams may be increased or diminished; but we do not generally find it necessary to make any changes in this respect. When it is necessary to increase or diminish the distance to which the shovels shall penetrate the earth this is effected sufficiently by changing the pitch of these shovels. Such a change of pitch can be readily produced by means of the braces $s$ $s$, which are pivoted to the beams at their upper extremities and are attached to the iron plates $t$ $t$, which are made fast to the respective shanks of the different shovels, and through which a series of holes is made, as shown in the drawing. By attaching these braces to the plates at the holes higher up or lower down the pitch of the shovels may be varied to suit circumstances. This attachment of the braces $s\ s$ to the shovel-shanks $p'\ p'$ is made by wooden pins, which are made strong enough for ordinary service, but which are intended to break before any dangerous strain can be brought upon any other part of the cultivator by striking a root or other obstacle. A receptacle for carrying a supply of such pins so that they may be always at hand is shown at $d$. Rings $e'\ e'$ are attached to the cultivator-beams, by means of which those beams may be suspended upon hooks at the ends of the rod $e$ whenever it is desirable to hold the shovels clear from the earth.

These contrivances, and also the use of wooden pins, as above shown, are already well-known and are not claimed by us; but What we do claim as new, and desire to secure by Letters Patent, is—

1. The semicircular contrivance J, with its appendages $n$ and $g$, constructed and operating as described.

2. The combination and arrangement of the axle B C with its perforations, pins or bolts $c\ c$, tubular devices $r\ r$, beams P P, wheels A A, and parts $b\ b$, all constructed, arranged, and operating substantially in the manner and for the purposes herein described.

3. The combination of the inner and outer perforated arms of the axle B C, bolts or pins $c\ c$, and the grooved parts $b\ b$ of the wheels, for adjusting the height of the axle and at the same time maintaining the proper relation of the beams and shovels to the ground, as herein set forth.

JOHN FANING.
FRIEDRICH LEGLER.

Witnesses:
ROBT. DONAHUE,
J. R. BACKUS. (43)